UNITED STATES PATENT OFFICE.

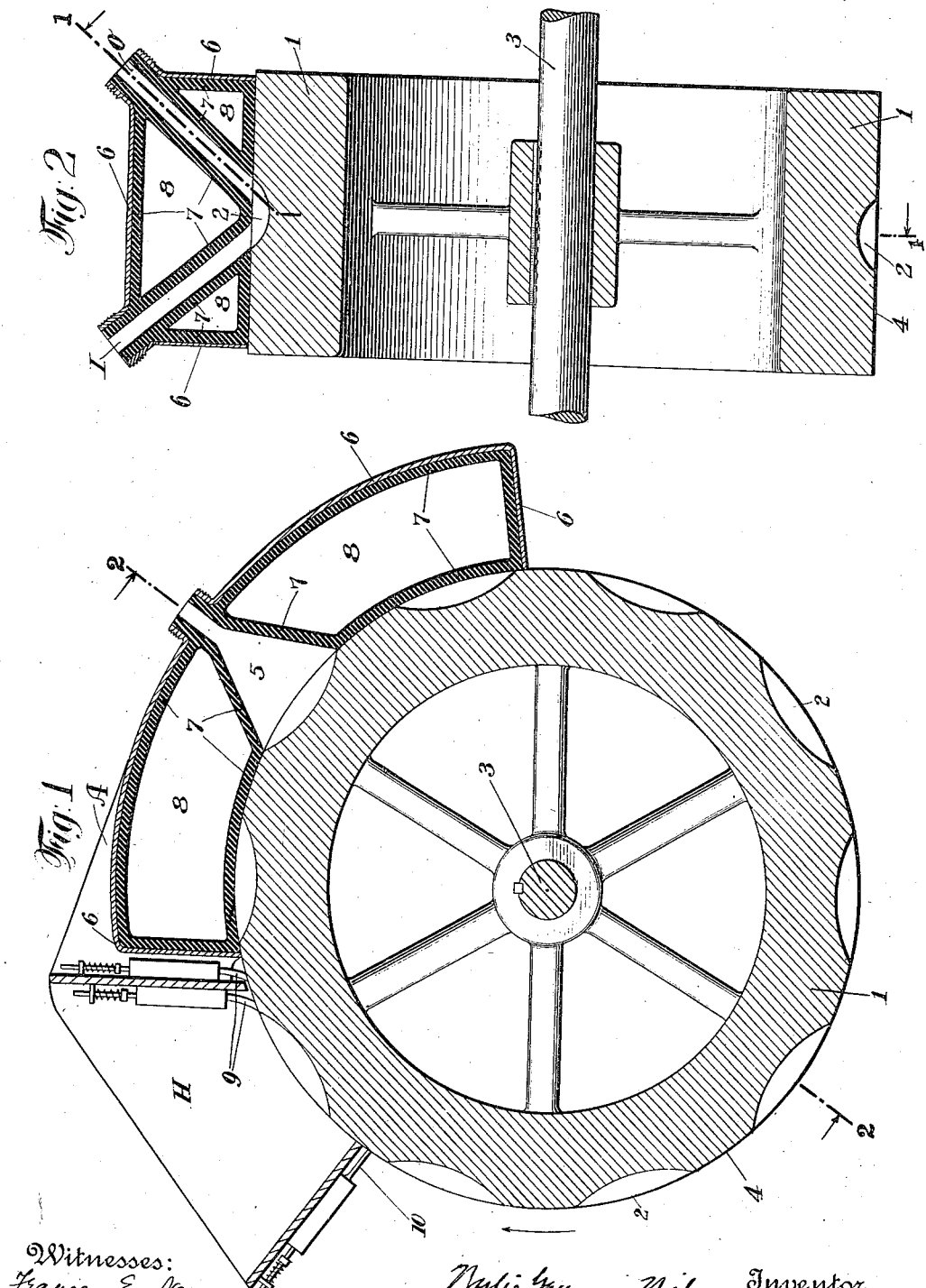

WYLIE GEMMEL WILSON, OF ELIZABETH, NEW JERSEY, ASSIGNOR TO W. G. WILSON COMPANY, OF MONTCLAIR, NEW JERSEY, A CORPORATION OF NEW JERSEY.

CONVEYING AND DISCHARGING APPARATUS.

1,041,548.  Specification of Letters Patent.  Patented Oct. 15, 1912.

Application filed August 29, 1911. Serial No. 646,676.

*To all whom it may concern:*

Be it known that I, WYLIE GEMMEL WILSON, a subject of the King of Great Britain, residing at Elizabeth, in the county of Union and State of New Jersey, have invented certain new and useful Improvements in Conveying and Discharging Apparatus, of which the following is a specification, reference being had therein to the accompanying drawings.

This invention relates to apparatus for conveying and discharging concrete and other aggregates or other material, and is particularly intended for use as a part of cement or concrete gun outfits, although adapted for a great variety of other uses.

In the accompanying drawings, Figure 1 is a vertical central section of apparatus embodying the present invention, the section being at right-angles to the shaft of the conveyer wheel. Fig. 2 is a sectional view at line 2—2 of Fig. 1.

In the drawings, 1 is a rotatable wheel provided peripherally with a number of conveyer pockets 2. The wheel is fixed on a shaft 3 which may be supported in any suitable bearings and driven in any suitable manner. Between the pockets 2 in the periphery of the wheel there are plane surfaces 4 separating one pocket from another. Against the peripheral surface of this conveyer wheel there is tightly held by a suitable frame-work A, partially indicated, a device 5 the purposes of which are to cover the pockets 2 as they are brought by the rotation of the wheel opposite to the device, and to forcibly discharge the contents of the pockets one after another. This device 5 may be called the pocket covering and discharging device, and it is made up of a steel casing 6 the inner side of which is curved on the arc of a circle corresponding to the periphery of the conveyer wheel 1. The casing is made of a length sufficient to cover a plurality of pockets (in the form shown) and is made of a width sufficient to cover one or more pockets laterally. The casing 6 is open on its inner curved surface, and the casing is interiorly fitted with an inflated rubber casing 7 provided with two passages I and O that intersect and communicate one with another at their inner ends, where they also are open to a pocket 2, as the pockets are successively brought opposite the intersection of the passageways which are also disposed one in relation to another transversely of the device 5, as shown in Fig. 2. These passageways are walled by portions of the rubber casing 7 and are surrounded by the compressed-air chambers or chamber 8. When this rubber casing is inflated it makes a tight joint with the solid portions 4 of the carrier-wheel periphery. Material is fed to the pockets as the wheel is rotated from a hopper H or any other suitable source of supply, and when a pocket 2 comes opposite the intersection of the passages I and O, if I be considered as the inlet and O as the outlet for a current of any suitable fluid under pressure, such as compressed air, water under head, or steam, then the material in each pocket will be blown thereout by the air current entering the inlet passage and passing through the pocket outwardly through the outlet. The casing 6 in the form of my invention shown is extended in the form of an annular threaded nipple around the inlet and also around the outlet passageways for attachment of suitable conduits. The conduit attached to the inlet I, may lead from any source of fluid under pressure, and the conduit attached to the outlet O may be a hose provided at its far end with a nozzle, if desired, for depositing the material conveyed from the hopper.

When the inflatable casing 8 is properly inflated to make a tight joint with the periphery of conveyer 1, the fluid current under pressure is prevented from flowing out of the pockets 2 as they are successively brought opposite their discharging port. The hopper H, also supported by framework A, carries on one side adjacent to the pocket covering and discharge device a plurality of spring-pressed scrapers 9 the working ends of which abut on the peripheral surface of conveyer 1 and keep the surface clean or substantially free from grit which otherwise might be carried against the inner side of the pneumatic casing 8 and unduly abrade it. The hopper also carries another similar scraper 10 at that side of it which is approached by the pockets when the conveyer rotates.

The present apparatus differs from certain other apparatus more or less like it in leaving many of the pockets 2 unencased and securing their exhaustion of fluid under pressure, after discharge of material, without the use of specially arranged air-vents.

What I claim is:—

1. The combination of a wheel-shaped conveyer the periphery of which is provided with pocket-forming recesses spaced apart one from another; an elastic covering for the pocketed periphery of the conveyer; a rigid casing for the ends, opposite sides and the outward surface of said covering, said covering and the casing being provided with an inlet and with an outlet that register through a pocket of the conveyer.

2. The combination of a wheel-shaped conveyer the periphery of which is provided with pocket-forming recesses spaced apart one from another; an elastic covering for the pocketed periphery of the conveyer; a rigid casing for the ends, opposite sides and the outward surface of said covering, said covering and the casing being provided with an inlet and with an outlet that register through a pocket of the conveyer, and a hopper and scrapers that contact with the periphery of the conveyer between its pockets.

In testimony whereof I affix my signature in presence of two witnesses.

WYLIE GEMMEL WILSON.

Witnesses:
EDWARD E. BLACK,
F. E. NARES.